(12) United States Patent
Zhou et al.

(10) Patent No.: US 7,990,157 B2
(45) Date of Patent: Aug. 2, 2011

(54) CARD FOR SIMULATING PERIPHERAL COMPONENT INTERCONNECT LOADS

(75) Inventors: Hai-Qing Zhou, Shenzhen (CN); Chung-Chi Huang, Taipei Hsien (TW)

(73) Assignees: Hong Fu Jin Precision Industry (ShenZhen) Co., Ltd., Shenzhen, Guangdong Province (CN); Hon Hai Precision Industy Co., Ltd., Tu-Cheng, New Taipei (TW)

( * ) Notice: Subject to any disclaimer, the term of this patent is extended or adjusted under 35 U.S.C. 154(b) by 231 days.

(21) Appl. No.: 12/503,829

(22) Filed: Jul. 15, 2009

(65) Prior Publication Data

US 2011/0006783 A1 Jan. 13, 2011

(30) Foreign Application Priority Data

Jul. 8, 2009 (CN) .......................... 2009 1 0304139

(51) Int. Cl.
*H01H 31/14* (2006.01)
(52) U.S. Cl. ..................... 324/555; 324/762.01; 324/537
(58) Field of Classification Search .................. None
See application file for complete search history.

(56) References Cited

U.S. PATENT DOCUMENTS 7,667,466 B2 * 2/2010 Jackson ...................... 324/555
7,759,958 B2 * 7/2010 Cases et al. ............... 324/750.3
* cited by examiner

*Primary Examiner* — Jermele M Hollington
*Assistant Examiner* — Trung Q Nguyen
(74) *Attorney, Agent, or Firm* — Zhigang Ma

(57) ABSTRACT

A card for simulating peripheral component interconnect (PCI) loads of a computer motherboard uses a PCI interface to be inserted into a PCI slot of the computer motherboard to receive first to third voltage signals from the computer. First to third load modules of the card receive voltage signals from the computer via the PCI interface to simulating first to third power consumption of the computer.

13 Claims, 3 Drawing Sheets

CARD FOR SIMULATING PERIPHERAL COMPONENT INTERCONNECT LOADS

BACKGROUND

1. Technical Field

The present disclosure relates to cards for simulating loads and, particularly, to a card for simulating peripheral component interconnect (PCI) loads.

2. Description of Related Art

In motherboard manufacturing, it is necessary to test a motherboard's stability, for example, when load power of the motherboard is maximal, it is necessary to test whether the motherboard is stable. The load may be a central processing unit (CPU), a hard disk drive (HDD), an optical disk drive (ODD), a floppy disk drive (FDD), or a certain PCI device, and so on.

There is an ordinary method for testing a motherboard's stability, by which actual PCI devices are inserted in corresponding slots of the motherboard. However, it is costly to use the actual PCI devices for testing, and the test result may not be accurate.

DETAILED DESCRIPTION

Figure 1:
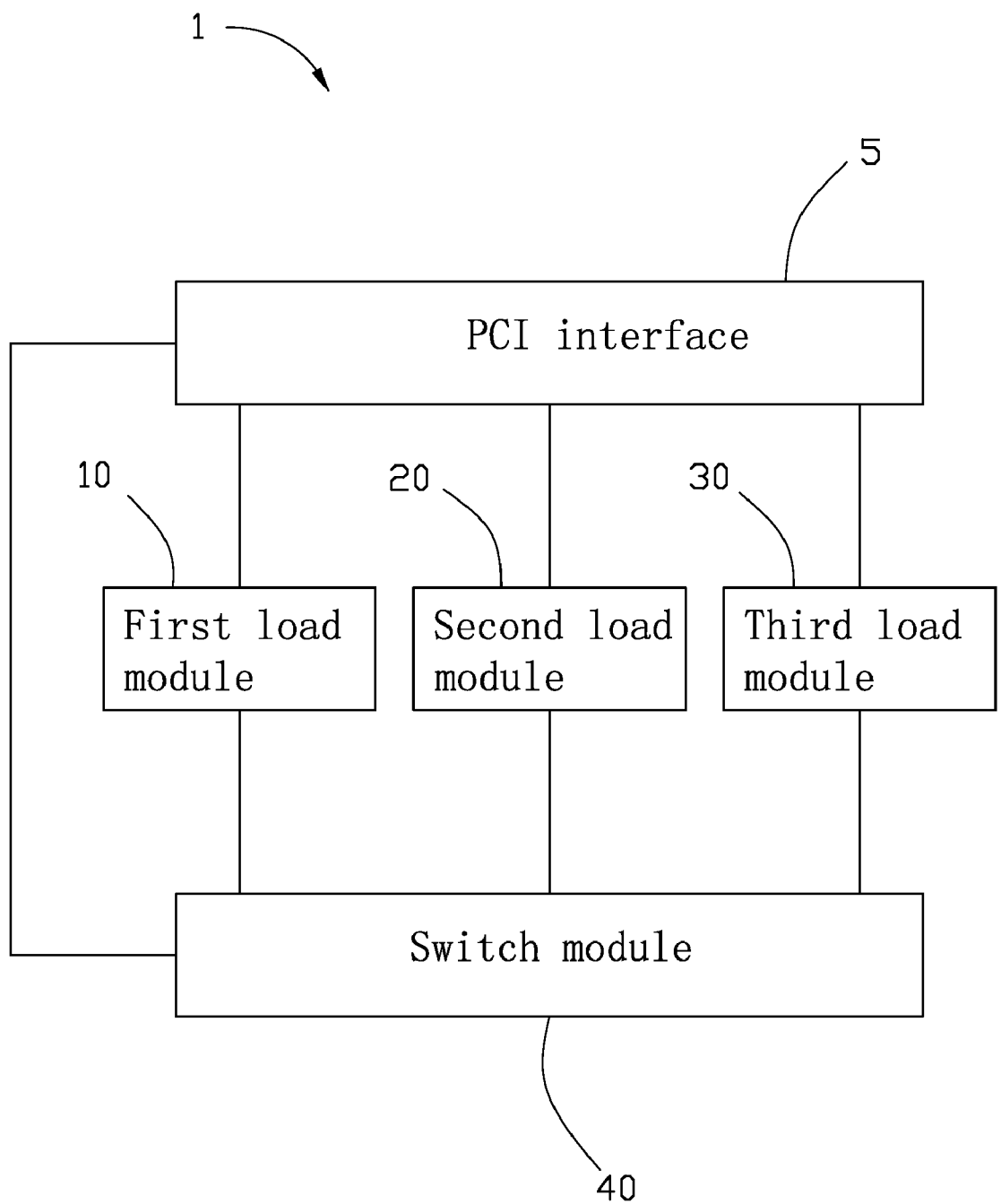
FIG. 1 is a block diagram of an exemplary embodiment of a card for simulating PCI loads.

Referring to FIG. 1, an exemplary embodiment of a card 1 for simulating peripheral component interconnect (PCI) loads includes a PCI interface 5, a first load module 10, a second load module 20, a third load module 30, and a switch module 40. The first load module 10, the second load module 20, the third load module 30, and the switch module 40 are connected to the PCI interface 5 for receiving voltage signals from the PCI interface 5. The switch module 40 is also connected to the first load module 10, the second load module 20, and the third load module 30, to switch the card 1 to work at a first load simulating status, a second load simulating status, or a third load simulating status.

In one embodiment, the first load module 10 is used to simulate 3.3 volt (V) loads and 5V loads. The second load module 20 is used to simulate 3.3V loads. The third load module 30 is used to simulate 5V loads. When the card 1 works at the first load simulating status by control of the switch module 40, only the first load module 10 receives corresponding voltage signals (3.3V and 5V voltage signals) to generate power consumption of 3.3V loads and 5V loads. When the card 1 works at the second load simulating status by control of the switch module 40, only the second load module 20 receives corresponding voltage signals (3.3V voltage signals) to generate power consumption of 3.3V loads. When the card 1 works at the third load simulating status by control of the switch module 40, only the third load module 30 receives corresponding voltage signals (5V voltage signals) to generate power consumption of 5V loads.

Figure 2:
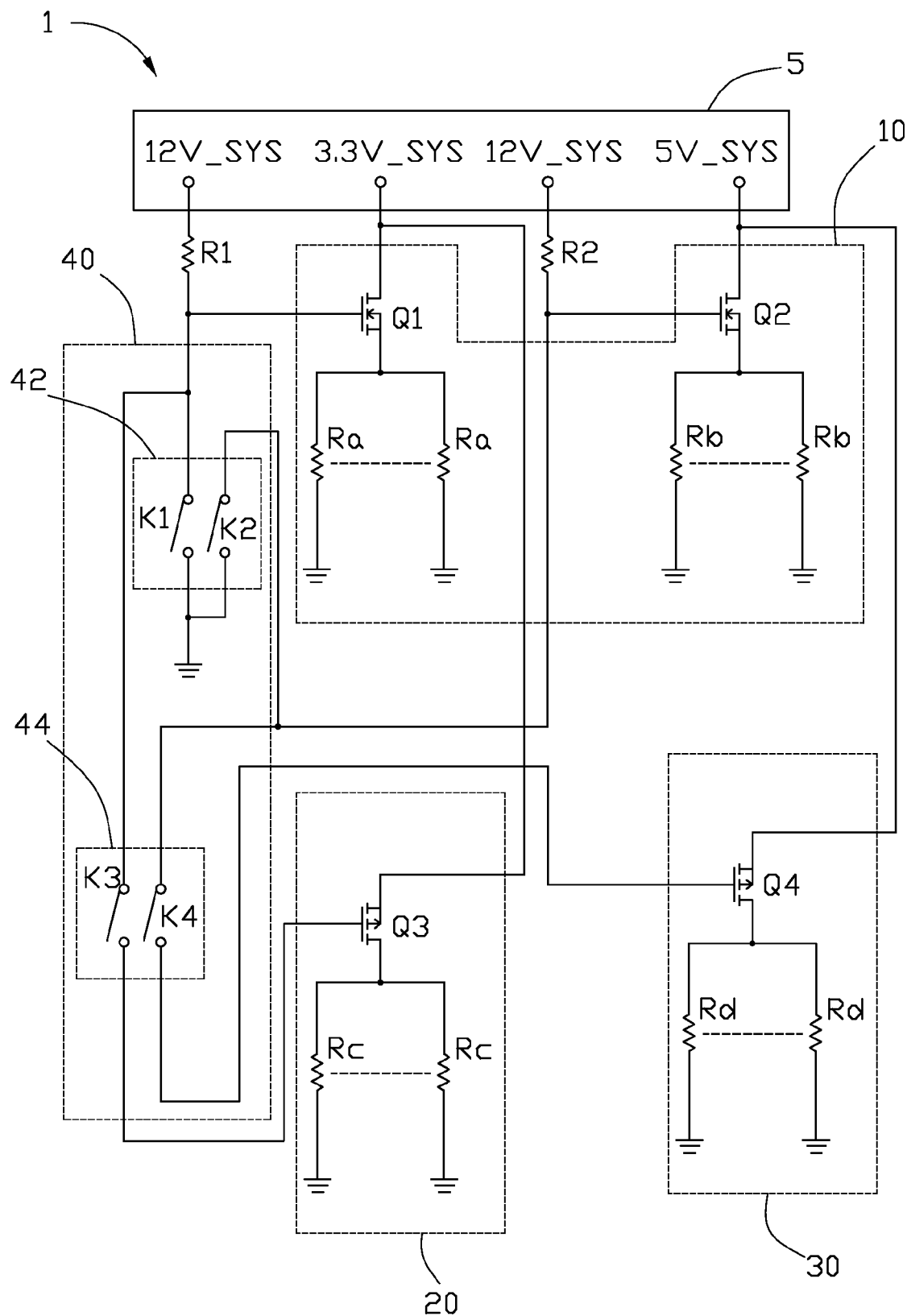
FIG. 2 is a circuit diagram of the card of FIG. 1, according to an embodiment.
Figure 3:
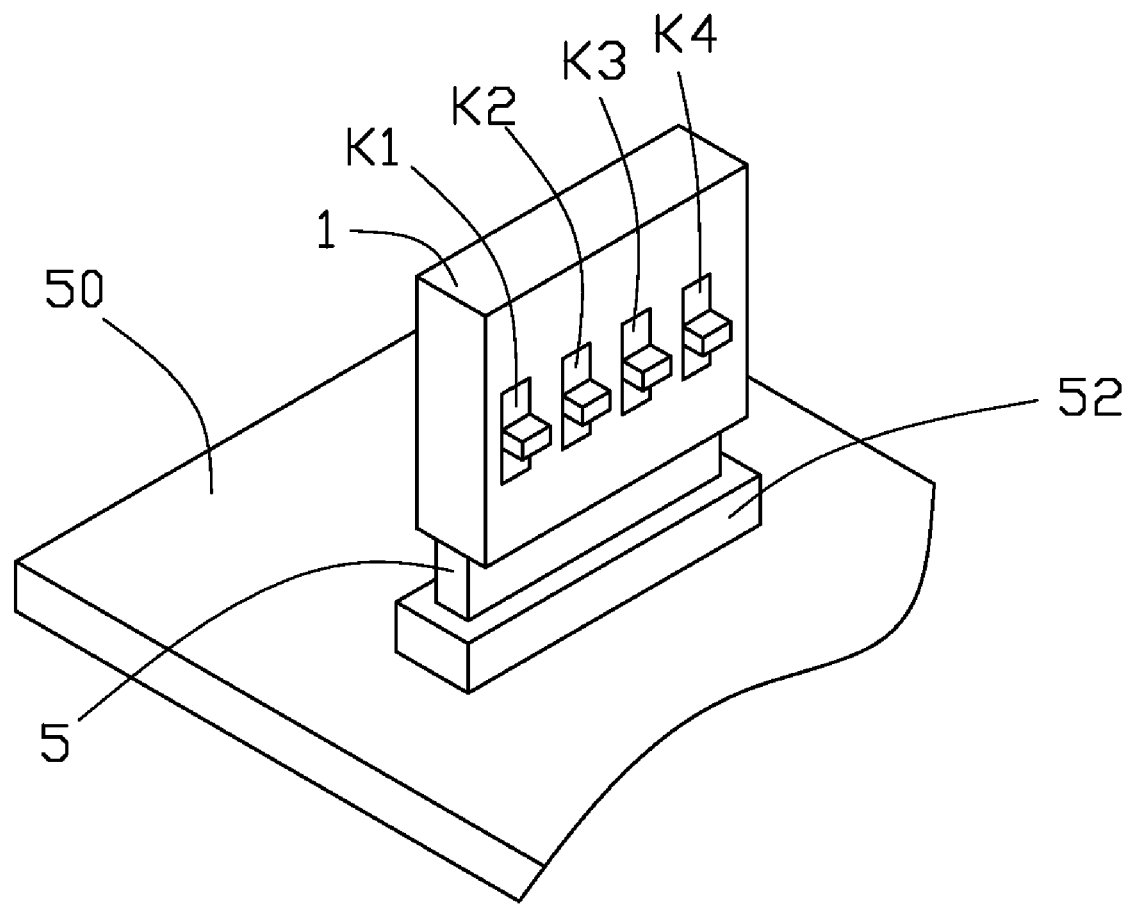
FIG. 3 is a schematic view of the card of FIG. 1, together with a computer motherboard.

Referring to FIGS. 2 and 3, the PCI interface 5 is used to be inserted into a PCI slot 52 of a computer motherboard 50 to be tested. The PCI interface 5 includes a first voltage receiving pin 3.3V_SYS, a second voltage receiving pin 5V_SYS, and a third voltage receiving pin 12V_SYS, which are corresponding to a 3.3V voltage pin, a 5V voltage pin, and a 12V voltage pin of the PCI slot 52, respectively.

The first load module 10 includes a first electrical switch such as an n-type field-effect transistor (FET) Q1, a second electrical switch such as an n-type FET Q2, a plurality of first load resistors Ra, and a plurality of second load resistors Rb. A drain (first terminal) of the FET Q1 is connected to the first voltage receiving pin 3.3V_SYS of the PCI interface 5. A gate (control terminal) of the FET Q1 is connected to the third voltage receiving pin 12V_SYS of the PCI interface 5 via a first divider resistor R1. A source (second terminal) of the FET Q1 is grounded via a parallel circuit of the first load resistors Ra. A drain (first terminal) of the FET Q2 is connected to the second voltage receiving pin 5V_SYS of the PCI interface 5. A gate (control terminal) of the FET Q2 is connected to the third voltage receiving pin 12V_SYS of the PCI interface 5 via a second divider resistor R2. A source (second terminal) of the FET Q2 is grounded via a parallel circuit of the second load resistors Rb.

The second load module 20 includes a third electrical switch such as a p-type FET Q3 and a plurality of third load resistors Rc. A source (first terminal) of the FET Q3 is connected to the first voltage receiving pin 3.3V_SYS of the PCI interface 5. A gate (control terminal) of the FET Q3 is connected to the third voltage receiving pin 12V_SYS of the PCI interface 5 via the switch module 40. A drain (second terminal) of the FET Q3 is grounded via a parallel circuit of the third load resistors Rc.

The third load module 30 includes a fourth electrical switch such as a p-type FET Q4 and a plurality of fourth load resistors Rd. A source (first terminal) of the FET Q4 is connected to the second voltage receiving pin 5V_SYS of the PCI interface 5. A gate (control terminal) of the FET Q4 is connected to the third voltage receiving pin 12V_SYS of the PCI interface 5 via the switch module 40. A drain (second terminal) of the FET Q4 is grounded via a parallel circuit of the fourth load resistors Rd.

The switch module 40 includes a first switch unit 42 and a second switch unit 44. The first switch unit 42 includes a first switch K1 and a second switch K2. The second switch unit 44 includes a third switch K3 and a fourth switch K4. The third voltage receiving pin 12V_SYS of the PCI interface 5 is grounded via a series circuit of the first divider resistor R1 and the first switch K1, and is connected to the gate of the FET Q3 via a series circuit of the first divider resistor R1 and the third switch K3. The third voltage receiving pin 12V_SYS of the PCI interface 5 is also grounded via a series circuit of the second divider resistor R2 and the second switch K2, and is connected to the gate of the FET Q4 via a series circuit of the second divider resistor R2 and the fourth switch K4. In one embodiment, the first to fourth switches K1-K4 are toggle switches. In other embodiments the type of the first to fourth switches K1-K4 can be changed according to requirements.

In one embodiment, resistances and a number of the first and second load resistors Ra and Rb satisfy that a whole power consumption of the plurality of first and second load resistors Ra and Rb is about 25W. Resistances and a number of the third load resistors Rc satisfy that a whole current of the plurality of third load resistors Rc is about 7.6 amperes (A). Resistances and a number of the fourth load resistors Rd satisfy that a whole current of the plurality of fourth load resistors Rd is about 5A. The resistances of the plurality of first load resistors Ra may be the same or different. The resistances of the plurality of second load resistors Rb may be the same or different. The resistances of the plurality of third load resistors Rc may be the same or different. The resistances of the plurality of fourth load resistors Rd may be the same or different. In other embodiments, the plurality of first load resistors Ra, the plurality of second load resistors Rb, the plurality of third load resistors Rc, and the plurality of fourth load resistors Rd may be variable resistors, which can easily change resistances according to requirements.

In use, the card 1 is inserted into the PCI slot 52 of the computer motherboard 50. When power consumption of 3.3V loads and 5V loads need to be tested, the first and second switches K1 and K2 are turned off, the third and fourth switches K3 and K4 are turned on. At this time, the FETs Q1 and Q2 are turned on, the FETs Q3 and Q4 are turned off. The plurality of first load resistors Ra receive 3.3V voltage from the computer motherboard 50 via the first voltage receiving pin 3.3V_SYS of the PCI interface 5, therefore the plurality of first load resistors Ra simulate 3.3V power consumption of the computer motherboard 50. Meanwhile, the plurality of second load resistors Rb receive 5V voltage from the computer motherboard 50 via the second voltage receiving pin 5V_SYS of the PCI interface 5, therefore the plurality of second load resistors Rb simulate 5V power consumption of the computer motherboard 50.

When only power consumption of 3.3V loads need to be tested, the first to third switches K1-K3 are turned on and the fourth switch K4 is turned off. At this time, only the plurality of third load resistors Rc receive 3.3V voltage from the computer motherboard 50 via the first voltage receiving pin 3.3V_SYS of the PCI interface 5, therefore the plurality of third load resistors Rc simulate 3.3V power consumption of the computer motherboard 50. When only power consumption of 5V loads need to be tested, the first, second, and fourth switches K1, K2, and K4 are turned on and the third switch K3 is turned off. At this time, only the plurality of fourth load resistors Rd receive 5V voltage from the computer motherboard 50 via the second voltage receiving pin 5V_SYS of the PCI interface 5, therefore the plurality of fourth load resistors Rd simulate 5V power consumption of the computer motherboard 50.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A card for simulating peripheral component interconnect (PCI) loads of a computer motherboard, comprising:
  a PCI interface operable to be inserted into a PCI slot of the computer motherboard, and comprising a first to a third voltage receiving pins to receive a first to a third voltage signals, respectively, from the computer; and
  a first load module, comprising:
    at least one first load resistor;
    at least one second load resistor;
    a first electrical switch, wherein a first terminal of the first electrical switch is connected to the first voltage receiving pin of the PCI interface, a control terminal of the first electrical switch is connected to the third voltage receiving pin of the PCI interface via a first divider resistor, a second terminal of the first electrical switch is grounded via the at least one first load resistor, the first electrical switch is turned on in response to the control terminal of the first electrical switch being at a high voltage status; and
    a second electrical switch, wherein a first terminal of the second electrical switch is connected to the second voltage receiving pin of the PCI interface, a control terminal of the second electrical switch is connected to the third voltage receiving pin of the PCI interface via a second divider resistor, a second terminal of the second electrical switch is grounded via the at least one second load resistor, the second electrical switch is turned on in response to the control terminal of the second electrical switch being at a high voltage status.

2. The card of claim 1, wherein the first to third voltage signals are 3.3 volts, 5 volts, and 12 volts, respectively.

3. The card of claim 1, wherein the first and second electrical switches are n-type field-effect transistors (FETs), the first, control, and second terminals are corresponding to a drain, a gate, and a source of each of the n-type FETs.

4. The card of claim 1, wherein the resistances and the number of the at least one first and second load resistors satisfy that a whole power consumption of the at least one first and second load resistors is about 25W.

5. The card of claim 1, further comprising:
  a switch module comprising first to fourth switches, wherein the control terminal of the first electrical switch is grounded via the first switch, the control terminal of the second electrical switch is grounded via the second switch;
  a second load module, comprising:
    at least one third load resistor; and
    a third electrical switch, wherein a first terminal of the third electrical switch is connected to the first voltage receiving pin of the PCI interface, a control terminal of the third electrical switch is connected to the control terminal of the first electrical switch via the third switch, a second terminal of the third electrical switch is grounded via the at least one third load resistor, the third electrical switch is turned off in response to the control terminal of the third electrical switch being at a high voltage status; and
  a third load module, comprising:
    at least one fourth load resistor; and
    a fourth electrical switch, wherein a first terminal of the fourth electrical switch is connected to the second voltage receiving pin of the PCI interface, a control terminal of the fourth electrical switch is connected to the control terminal of the second electrical switch via the fourth switch, a second terminal of the fourth electrical switch is grounded via the at least one fourth load resistor, the fourth electrical switch is turned off in response to the control terminal of the fourth electrical switch being at a high voltage status.

6. The card of claim 5, wherein the third and fourth electrical switches are p-type field-effect transistors (FETs), the first, control, and second terminals are corresponding to a source, a gate, and a drain of each of the p-type FETs.

7. The card of claim 5, wherein the resistance and the number of the at least one third load resistor satisfy that a whole current of the at least one third load resistor is about 7.6 amperes.

8. The card of claim 5, wherein the resistance and the number of the at least one fourth load resistor satisfy that a whole current of the at least one fourth load resistor is about 5 amperes.

9. The card of claim 5, wherein the first to fourth switches are toggle switches.

10. The card of claim 5, wherein the at least one first to fourth resistors comprises at least one variable resistor.

11. A card for simulating peripheral component interconnect (PCI) loads of a computer motherboard, comprising:
- a PCI interface operable to be inserted into a PCI slot of the computer motherboard, and comprising first and second voltage receiving pins to receive first and third voltage signals from the computer; and
- a load module, comprising:
    - at least one load resistor; and
    - an electrical switch, wherein a first terminal of the electrical switch is connected to the first voltage receiving pin of the PCI interface, a control terminal of the electrical switch is connected to the second voltage receiving pin of PCI interface via a first divider resistor, a second terminal of the electrical switch is grounded via the at least one load resistor, the electrical switch is turned on in response to the control terminal of the electrical switch being at a high voltage status.

12. The card of claim 11, wherein the first voltage signal is 3.3 volts or 5 volts, the second voltage signal is 12 volts.

13. The card of claim 11, wherein the electrical switch is an n-type field-effect transistor (FET), the first, control, and second terminals are corresponding to a drain, a gate, and a source of the n-type FET.

* * * * *